United States Patent

Gosman

[15] 3,688,324
[45] Sept. 5, 1972

[54] TAP HOLDER
[72] Inventor: Neil W. Gosman, Northport, N.Y.
[73] Assignee: Maehr Lesnor Manufacturing, Farmingdale, N.Y.
[22] Filed: Nov. 19, 1970
[21] Appl. No.: 91,065

[52] U.S. Cl.................................................10/141 H
[51] Int. Cl.....................................................B23g 5/14
[58] Field of Search.10/89 F, 89 H, 129, 134, 141 H; 279/16, 18; 408/139, 141

[56] References Cited

UNITED STATES PATENTS

| | | | |
|---|---|---|---|
| 1,763,717 | 6/1930 | Morgan | 279/16 |
| 2,371,330 | 3/1945 | Irstad | 279/16 |
| 3,220,030 | 11/1965 | Supernor | 10/129 |
| 3,466,681 | 9/1969 | Benjamin et al. | 408/139 |

OTHER PUBLICATIONS

American Machinist, Feb. 1924, page 267

Primary Examiner—Richard J. Herbst
Assistant Examiner—E. M. Combs
Attorney—Albert F. Kronman

[57] ABSTRACT

A tap holder which couples a threading tap tool to a power rotary drive. Free vertical movement is provided for the tap holder to compensate for the difference in the rate of movement of the tap into the workpiece and the drive speed of the rotary power source. A positive rotary drive is applied through a double ended pin transversely carried by a portion of the tap holder. The pin is engaged by the surfaces of a bayonet-type slot in the holder.

3 Claims, 4 Drawing Figures

PATENTED SEP 5 1972 3,688,324

INVENTOR.
NEIL W. GOSMAN
BY
Albert H. Krosman
ATTORNEY

3,688,324

TAP HOLDER

BACKGROUND OF THE INVENTION

In order to cut an internal thread in a bore, the tap holder must permit a certain amount of longitudinal play inasmuch as it is generally impossible to match the feed rate of the power drive to the self-feeding rate of the tap. Some prior art devices have employed tap holders having spring centering devices consisting of two springs opposing each other for resiliently positioning the tap. Such arrangements lack the necessary initial contact force to start the tap cutting a thread. If the spring force is not great enough, the tap may rotate against the workpiece for several turns, causing burrs and sometimes hardening the surface of the workpiece. If the spring force is too great it may damage the tap. Once the threading has started, it is only necessary to rotate the tap since it feeds itself automatically into the bore.

When the rotation of the machine tool is reversed to remove the tap from the threaded hole, the tap may rise either faster or slower than the feed of the machine tool. Here again, the tap holder must provide for a difference in longitudinal movement. The present invention overcomes the faults of prior art devices and provides the necessary functions to insure accurate, continuing tapping without damage to the cutting tool. When the tap starts its cut, a positive force acts on the tap to move it into the bore. During the cutting operation, a longitudinal force on the walls of a bayonet-slotted portion of the tap holder engages a pin coupled to the tap to provide a positive rotary drive while permitting a difference in longitudinal movement between the tap and the portion of the tap holder coupled to the driving machine. When the power drive is reversed another longitudinal face in the bayonet-slotted portion engages the pin to remove the tap while again providing for differential longitudinal movement.

For a better understanding of the present invention, together with other details and features thereof, reference is made to the following description taken in connection with the accompanying drawings, in which drawings identical parts have been given the same reference numerals.

DESCRIPTION OF THE PREFERRED EMBODIMENT

Figure 1:
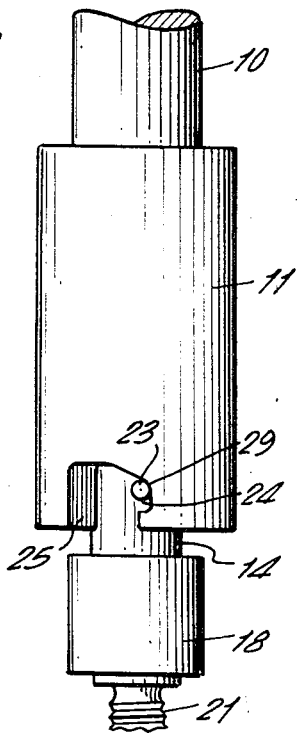
FIG. 1 is a view in side elevation of a tap holder made in accordance with the present invention.
Figure 2:
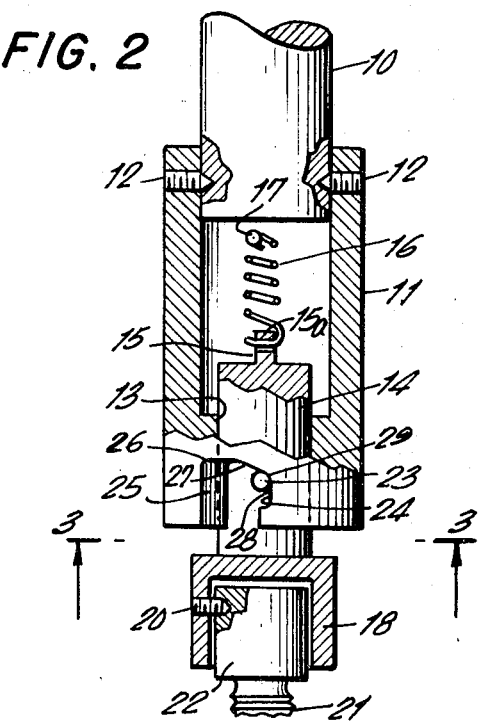
FIG. 2 is a view similar to FIG. 1 partially broken away showing the driving sleeve, the drive rod, and the tap holder.
Figure 3:
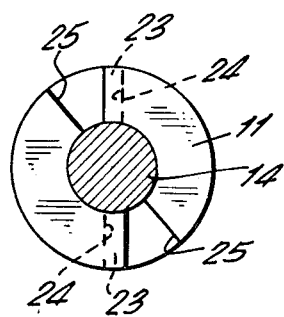
FIG. 3 is a cross-sectional view taken on line 3—3 in FIG. 2.
Figure 4:
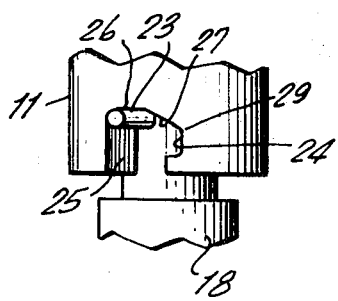
FIG. 4 is a partial side view of the tap holder when the tap is being withdrawn from the workpiece.

Referring now to the figures, the tap holder is secured to a power driven shaft 10, which may be coupled to a drill press, milling machine, or the like. A sleeve 11 is secured to the shaft 10 by any suitable means such as a pair of set screws 12. The lower end of the sleeve 11 is provided with a cylindrical bearing surface 13 of reduced diameter, which freely supports a drive rod 14. The upper end of the drive rod 14 is provided with a tang 15 having an eyelet 15a for holding the lower end of a spring 16. The upper end of the spring 16 is secured to a pin 17 attached to the sleeve 11. The spring 16 is under tension and serves to draw the rod 14 into the sleeve 11 at all times. The spring 16 is also under torque in a direction opposite to that of the thread tapping rotation. A tap holder 18 is formed in the lower end of the rod 14 and extends beyond the bottom of the sleeve 11 as shown in FIGS. 1, 2, and 4. A set screw 20 serves to secure the tap 21 within the holder 18 by engaging a hole formed in the top of the tap shank 22.

A transverse pin 23 is carried in the drive rod 14 and extends outwardly thereof on either side of the rod. The extended ends of the pin 23 enter two opposed bayonet-type slots 24 in the sleeve 11. The bayonet-type slots each have a first longitudinal wall 25, a top horizontal surface 26, an inclined ramp surface 27 which leads to a shorter longitudinal wall and makes an obtuse angle with said shorter wall. The shorter longitudinal wall 28 bears against the ends of the pin 23 when the tap is in the thread cutting mode. The first longitudinal wall 25, which is parallel to the shorter wall and spaced from it, engages the pins 23 when the tap is being withdrawn from the workpiece. A right handed thread is assumed; if a left hand thread is to be cut, the wall surfaces 25 and 28 are reversed.

The operation of the tap holder is as follows:

When the tap is not in engagement with the workpiece, the pins 23 rest at the point 29 where the ramp 27 meets the shorter wall 28. The pins are held in this position by the torque of the spring 16 as the tap is moved toward the workpiece. The juncture of the ramp and shorter wall 28 provides a corner which forces the tap into the workpiece to get it started. The inclined surface of the ramp 27 prevents damage to the tap as it moves into the work. As soon as the threading has started the tap will move into the workpiece because of its self-threading ability, and the fact that the machine feed is less than that of the tap advance. As the tap 21 moves into the work, the pins 23 will slide downwardly along the short wall surface 28 in the direction of the workpiece.

At the conclusion of the tapping operation, the tap is withdrawn by reversing the direction of the driving machine. The drag of the tap in the workpiece causes the drive rod 14 to slip within the sleeve 11 bringing the ends of the pin 23 to bear against the longer longitudinal walls 25 of the bayonet-type slots 24 (see FIG. 4). The tap is then turned out of the workpiece while being able to move longitudinally according to its own pitch which will be somewhat different from the machine feed travel.

As the tap leaves the workpiece, the spring 16 and the ramp surface 27 will return the pin ends to the desired starting location 29.

Having thus fully described the invention, what is claimed as new and desired to be secured by Letters Patent of the United States, is:

1. A threading tap holder comprising a tubular outer sleeve adapted to be connected to a machine for power rotation, an elongated drive rod freely and axially mounted in the sleeve, and extending outwardly thereof at one end, a tap holding portion at the outer end of the rod, a spring under tension coupled between the sleeve and the inner end of the drive rod, a transverse pin carried by the drive rod and extending outwardly thereof at each end at right angles to the longitudinal axis of the rod, opposed bayonet-type slots formed in the sleeve to receive the ends of the pin, each of said slots including a first longitudinal surface, a second, shorter longitudinal surface spaced from the first surface, a horizontal surface and an inclined ramp surface between the longitudinal surfaces.

2. A tap holder according to claim 1 wherein the ramp surface, joining the first and second surfaces is inclined at an obtuse angle with respect to the second longitudinal surface for exerting pressure on the tap to get it started to cut a thread.

3. A tap holder according to claim 1 wherein the spring also exerts a rotary force on the rod to turn the rod so that the pin normally engages said second longitudinal surface where it meets the ramp.

* * * * *